United States Patent
Garwin et al.

[11] Patent Number: 5,218,173
[45] Date of Patent: Jun. 8, 1993

[54] SHIELDING MATERIALS FOR ELECTROMAGNETIC DIGITIZERS

[75] Inventors: Richard L. Garwin, Scarsdale; Gregory F. Russell, Yorktown Heights, both of N.Y.

[73] Assignee: IBM Corporation, Yorktown Heights, N.Y.

[21] Appl. No.: 778,025

[22] Filed: Oct. 17, 1991

[51] Int. Cl.⁵ .............................. G08C 21/00
[52] U.S. Cl. ................................ 178/18; 178/19
[58] Field of Search ............................ 178/18, 19

[56] References Cited

U.S. PATENT DOCUMENTS

| | | | |
|---|---|---|---|
| 4,143,240 | 3/1979 | Kobayashi et al. | 178/19 |
| 4,497,977 | 2/1985 | Saito et al. | 178/19 |
| 4,644,102 | 2/1987 | Blesser et al. | 178/19 |
| 4,645,869 | 2/1987 | Rockwell et al. | 178/18 |
| 4,678,870 | 7/1987 | Taguchi et al. | 178/18 |
| 4,704,501 | 11/1987 | Taguchi et al. | 178/18 |
| 4,853,497 | 8/1989 | Landmeier | 178/18 |
| 4,956,526 | 9/1990 | Murakami et al. | 178/18 |

FOREIGN PATENT DOCUMENTS 61-141026  5/1986  Japan .
1-158522   1/1989  Japan .
1-102622   4/1989  Japan .

*Primary Examiner*—Stafford Schreyer
*Attorney, Agent, or Firm*—Sterne, Kessler, Goldstein & Fox

[57] ABSTRACT

Shielding materials used in electromagnetic digitizers which are packaged in a notebook computer environment. Shielding materials with sufficiently high magnetic permeability to increase the magnetic signal detected by the digitizer sensor grid can be used in such an environment, and can be placed in direct contact with the sensor grid. Aluminum or copper shields can also be placed in direct contact with the sensor grid to provide the requisite shielding. A combination of conductive and ferrite material can also be used as the conductive base material provides for shielding and a layer of ferrite material increases the magnetic signal and prevents signal attenuation by the conductor.

21 Claims, 3 Drawing Sheets

SHIELDING MATERIALS FOR ELECTROMAGNETIC DIGITIZERS

DESCRIPTION

1. Technical Field

The present invention relates generally to electromagnetic digitizers. More particularly, the present invention relates to shielding materials used in electromagnetic digitizers which are packaged in a notebook computer environment.

2. Background Art

The present invention relates to shielding materials used in electromagnetic digitizers. Digitizers of this type use a sensor grid to electromagnetically determine the coordinates of a point designated with a stylus or pen. Shielding from the magnetic distortions and disturbances emanating from the external environment is desirable in such a device. Conductive material normally acts as a shield, but results in attenuation or loss of signal. The signal attenuation can be counteracted by use of a spacer or gap between the sensor grid and conductive shield plate, or by use of a conductive material which is also highly magnetic. The magnetic characteristic of the material serves to enhance the signal.

Conventional digitizers have used materials such as iron, steel, or aluminum as the shield, and located the planar shield several millimeters below the sensor grid to isolate the sensor from the external environment. One product uses a silicon steel which causes much less attenuation of the signal than the above-mentioned materials. Some have no shield, and are susceptible to changes in accuracy and noise when placed on different surfaces.

When a digitizer is packaged over (or might be placed over) other system components (e.g., operational circuitry, including transformers and ground planes, and metallic structural elements) which include areas of high conductivity or ferrous materials, it is necessary to place a shield material between these system components and the sensor grid to prevent distortions to the detected magnetic pen signal. However, in conventional digitizers, placing a shield of conductive material too close to the sensor grid would result in attenuation of the magnetic field from the pen because of eddy currents induced in the conductive sheet. The eddy currents produce magnetic fields which partially cancel the fields from the pen. The signal cancellation increases as the conductive shield is brought closer to the sensor grid, and the signal is almost completely eliminated if the sensor grid loops are placed directly on top of the shield plate. This requires a gap or spacer between the sensor grid and shield plate. The variation of the attenuation with distance between the sensor grid and the shield plate places a constraint on the tolerance of the spacing, which can lead to increased manufacturing costs, depending on the method chosen to maintain the spacing. If this tolerance becomes too large, inaccuracies in the digitizer tablet data will result.

When a conductive shield such as aluminum is placed 0.5 mm behind the sensor grid in a conventional digitizer configuration (with 1 cm wide grid loops, and the pen coil located 2.0 cm above the grid), the signal voltage is reduced to about 10% of the signal without any shield. The signal power is thus reduced 100-fold (20 dB). The attenuation problem resulting from placing the shield in close proximity or in contact with the sensor grid can be reduced, however, through choice of the material used for the shield. In U.S. Pat. No. 4,956,526, the material chosen was a silicon steel composed of 4.0 to 7.0 weight percent of silicon. When a shield of this specific composition is configured in contact with the sensor grid, the voltage magnitude of the detection signal is maintained above the minimum required to operate the digitizer. Although the sensor grid and the silicon steel shield can be in contact, there is still signal attenuation as demonstrated by the increase in signal voltage as the distance between the sensor grid and the silicon steel shielding plate increases. placing a digitizer in a notebook computer environment presents further problems not solved through the use of shielding materials and configurations of conventional digitizers. Packaging the digitizer in this manner exacerbates the space and weight problems for the shield materials. Without shielding, the magnetic field from the pen is distorted by eddy currents and induced magnetic fields in metallic and ferromagnetic materials in circuitry and structural members. Further, the operational circuitry may produce independent magnetic fields which are picked up in the sensor grid and appear as noise to the digitizer circuitry, reducing accuracy and resolution. To address all of these constraints, the shield must isolate the sensor grid from distortion and noise sources below the digitizer, must not itself significantly degrade the digitizer performance, and must be lightweight and compact. It is additionally advantageous if the shield material can be formed to fit around obstacles in the periphery of the digitizer, to isolate the grid from irregularly shaped interference sources outside the active area.

Within this framework, it becomes apparent that the use of aluminum or copper with a spacer takes up too much space for the packaging environment envisioned for the present invention. The use of silicon steel as a shield in contact with the sensor grid does not completely solve the packaging problems as a fairly thick shield is required which takes up space and adds weight, and the silicon steel does have an attenuating effect. Further, silicon steel is rather brittle and will not conform as easily to different shapes.

DISCLOSURE OF INVENTION

The present invention is directed to shielding materials used in electromagnetic digitizers which are packaged in a notebook computer environment.

The first aspect of the invention is directed to shielding materials with sufficiently high magnetic permeability to increase the magnetic signal detected by the digitizer sensor grid. The shielding material can be conductive, in which case the product of the magnetic permeability and skin depth of the conductive shield must be greater than the width of the loops in the sensor grid. If the shielding material is non-conductive, then the product of the magnetic permeability and the thickness of the non-conducting shield must be greater than the width of the loops in the sensor grid. A shield made of such a material can be configured in direct contact with the sensor grid. Ferrites and Mumetal are two materials with sufficiently high magnetic permeability to increase the magnetic signal.

In one variation, a combination of conductive and ferrite materials may be used for the shield. The first layer beneath the grid is composed of ferrite material which terminates, but does not attenuate, the magnetic signal. Below this is placed a conductive layer which cancels AC magnetic fields from below the sensor grid, to prevent possible saturation of the ferrite material by those fields. With the proper selection and thicknesses of the conductive and ferrite materials, the shield plate would prevent penetration of the magnetic fields without causing attenuation. In fact, the signal voltage can be doubled by an appropriate layer of ferrite in contact with the sensor grid.

Some materials alone can both increase the magnetic signal and prevent penetration of the shield by the magnetic fields emanating from the operational circuitry and metallic structural elements. Mumetal is one such material and is characterized by increasing the magnetic detection signal, and by preventing penetration of the shield by the magnetic fields emanating from the operational circuitry and metallic structural elements.

In a third aspect of the invention, a conductor, such as aluminum or copper, is placed in close proximity to the sensor grid to provide shielding primarily from disturbances emanating from the operational circuitry and metallic structural elements of the digitizer. The aluminum or copper shields can be placed as close as 0.5 mm from the sensor grid and still allow sufficient signal strength, while providing the desired shielding.

The foregoing and other objects, features, and advantages of the present invention will be apparent from the following more particular description of preferred embodiments of the invention, as illustrated in the accompanying drawings.

BRIEF DESCRIPTION OF DRAWINGS

The invention will be better understood if reference is made to the accompanying drawings in which.

BEST MODE FOR CARRYING OUT THE INVENTION

Figure 1:
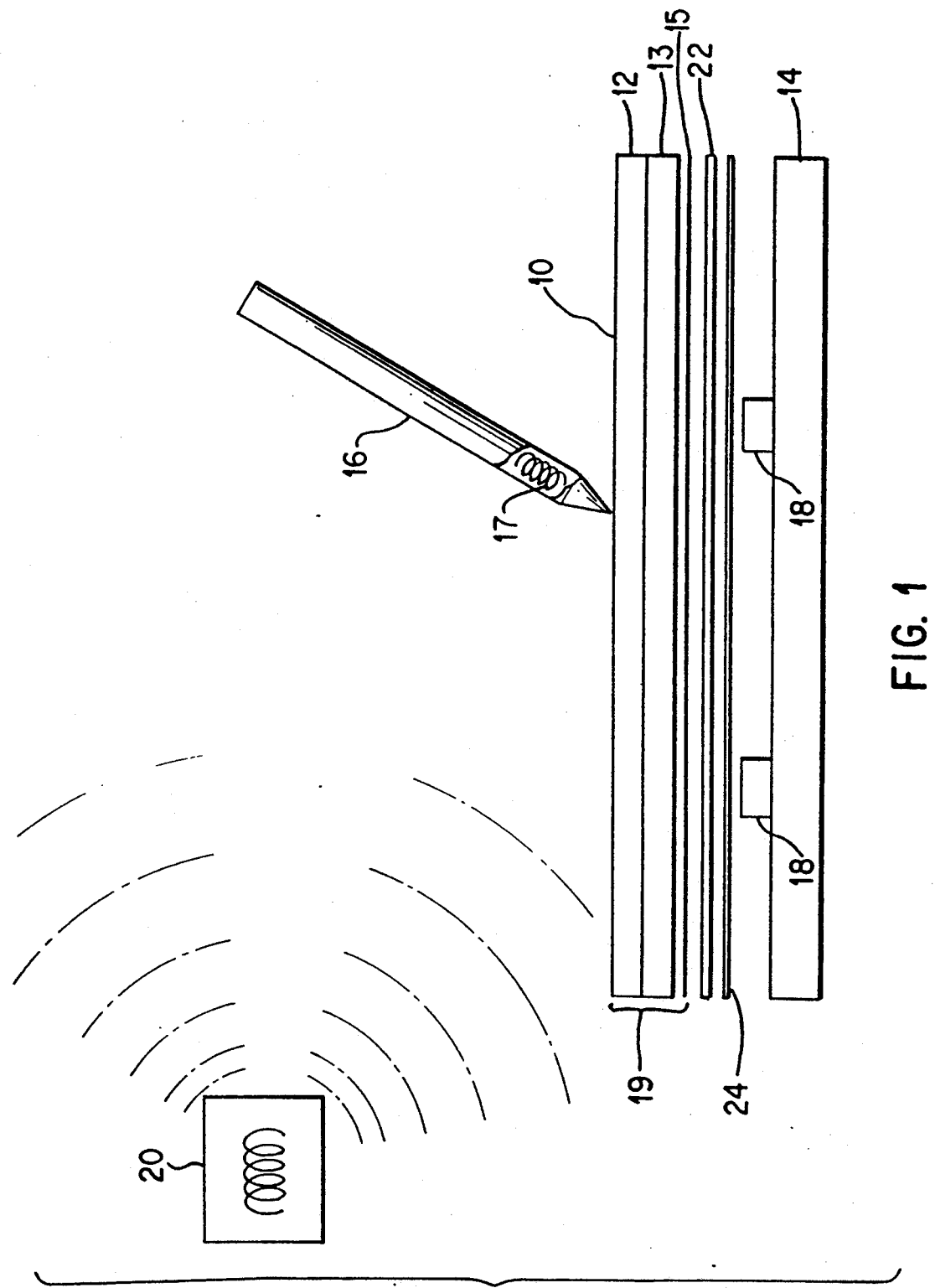
FIG. 1 is a cross-sectional view, not to scale, of an electromagnetic digitizer showing the general relation of the sensor grid, the shield plate, and the internal and external sources of interfering magnetic fields.

FIG. 1 is a cross-sectional view of an electromagnetic digitizer assembly as might be configured in a notebook computer environment, and includes a liquid crystal (LCD) or other display 12 and backlight 3 for display of the data. The pen or stylus 16, which includes a magnetic coil 17, is used to designate or input the desired point on the writing surface 10 through detection of an electromagnetic signal by the sensor grid 22. The operational circuitry shown generally at 14 calculates the coordinate value for the designated point. The electrostatic shield 15 isolates the sensor grid 22 from electrostatic noise generated by the LCD 12 or backlight 13.

All components disposed between the sensor grid 22 and the writing surface 10, including the display 12, backlight 13, and electrostatic shield 15, are shown collectively at 19. The shield plate 24 provides shielding from the internal sources of distortion or interfering magnetic fields, and, in the case of purely conducting shields, provides some reduction of noise from external sources. The internal sources of interference include the operational circuitry 14 and conductive or ferromagnetic material 18, such as transformers, ground planes, and metallic structural elements. The external sources of interference are represented in FIG. 1 by the source 20. One example of an electromagnetic digitizer in which the shielding materials of the present invention can be used is described in U.S. patent application Ser. No. 07/696,434, filed May 6, 1991, which is herein incorporated by reference. The cited application incorporated by reference and the present application have a common assignee.

Figure 2:
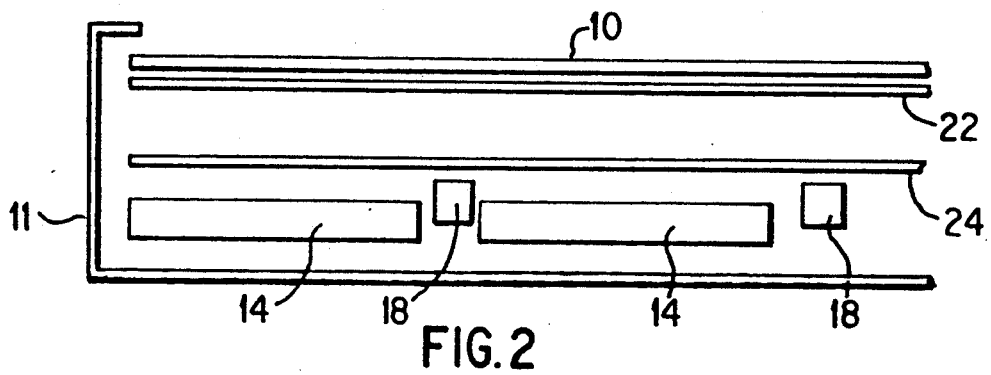
FIG. 2 is a simplified cross-sectional view, not to scale, of an electromagnetic digitizer Which shows the use of a wide space between the sensor grid and the shield plate.

FIG. 2 is a cross-sectional view of an electromagnetic digitizer with a conventional desktop digitizer structure. The digitizer is enclosed in a case 11 and includes operational circuitry 14 and conductive or ferromagnetic materials 18 (e.g., metallic structural elements). The shield plate 24 is shown disposed below the sensor grid 22 with a wide gap or space between these two components. In most conventional desktop digitizers, there is also a space between the sensor grid 22 and the writing surface 10, as shown in FIG. 2.

Figure 3:
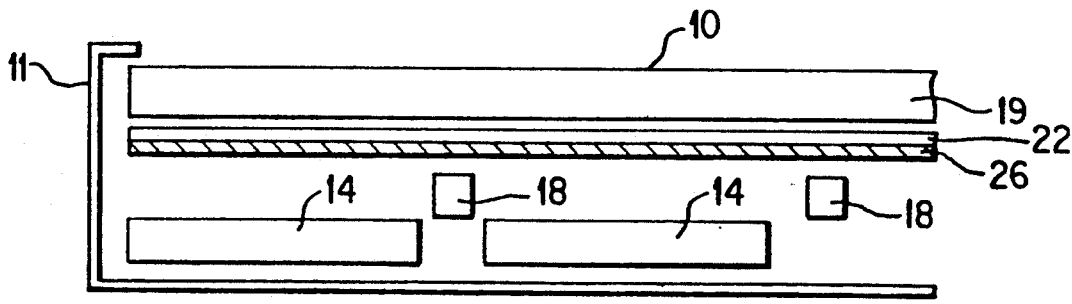
FIG. 3 is a simplified cross-sectional view, not to scale, of an electromagnetic digitizer with a high magnetic permeability shield.

FIG. 3 is a cross-sectional view of an electromagnetic digitizer as might be configured for packaging in a notebook computer environment. A digitizer in this configuration includes a case 11, operational circuitry 14, and conductive or ferromagnetic materials 18 as does the conventional desktop configuration. However, this configuration includes components, shown collectively at 19, disposed between the writing surface 10 and the sensor grid 22. The components shown collectively at 19 include the display 12, backlight 13, and electrostatic shield 15, as shown in FIG. 1. The shield plate as shown in the configuration of FIG. 3 is comprised of a highly magnetic material, that is, a material with a high magnetic permeability.

Figure 4:
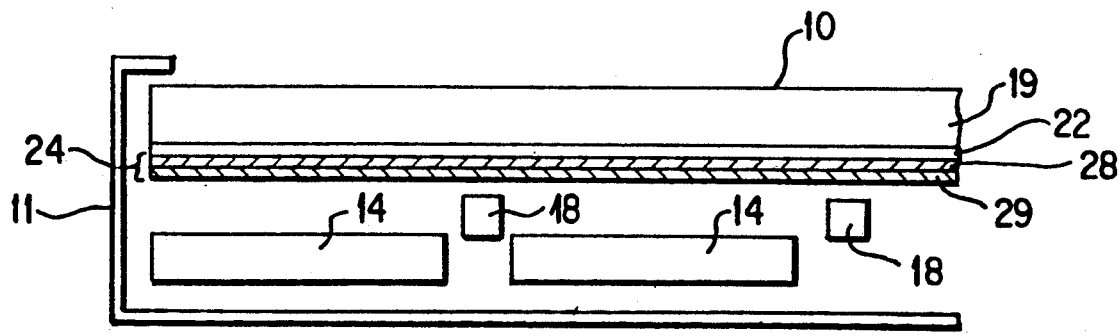
FIG. 4 is a simplified cross-sectional view, not to scale, of an electromagnetic digitizer with a shield plate comprised of ferrite and conductive material.

The shielding configuration shown in FIG. 4 might also be used when packaging the digitizer in a notebook computer environment. A shield plate 24, shown disposed below the sensor grid 22, is comprised of conductive material 29 with a layer of magnetic material 28 disposed on the upper surface of the conductor 29.

Figure 5:
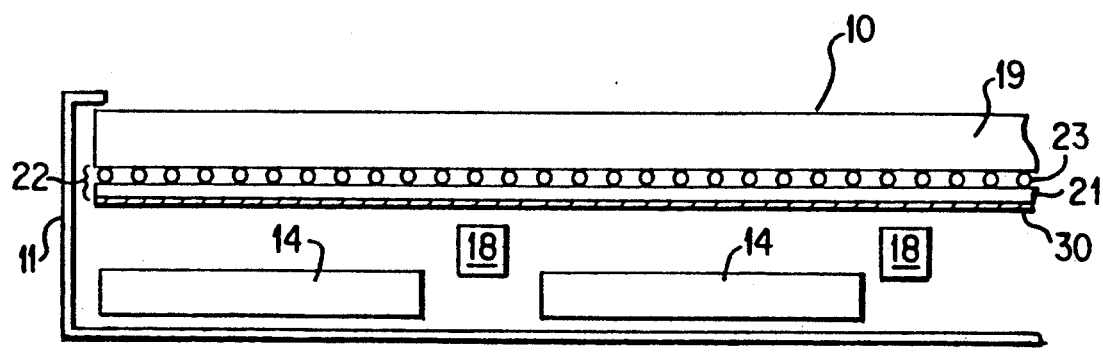
FIG. 5 is a simplified cross-sectional view, not to scale, of an electromagnetic digitizer with a conductive shield closely spaced with the sensor grid substrate.

FIG. 5 illustrates another alternative shielding configuration. The components of the sensor grid 22 are shown to illustrate the configuration of the wire loops 23 and the sensor grid substrate 21. The configuration of the wire loops within the sensor grid is shown in more detail in FIG. 6. The conductive shield 3 is shown in contact with the Sensor grid substrate 21. The conductive shield provides shielding from magnetic disturbances emanating primarily from the system components within the electromagnetic digitizer but also from the external environment 20. When the shield is placed between the operational circuitry and the sensor grid, it will provide the greatest degree of shielding from the magnetic fields emanating from the operational circuitry 14 and the conductive and magnetic material 18, but will also result indirectly in attenuation of magnetic fields emanating from the other side of the sensor grid (i.e., where the pen is held).

Figure 6:
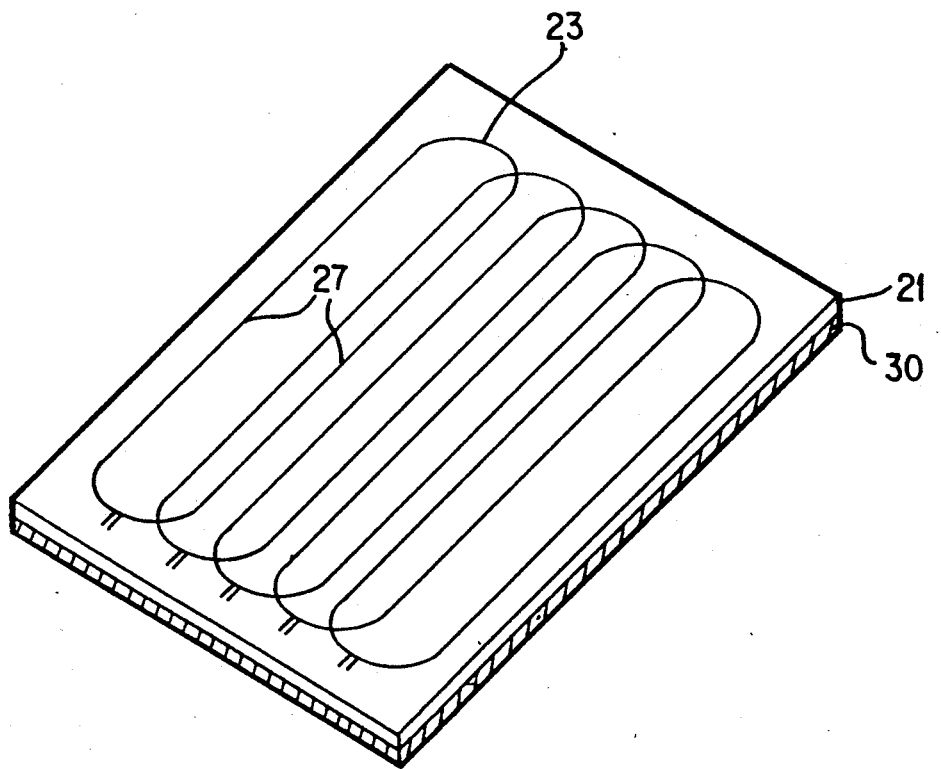
FIG. 6 is a simplified perspective view, not to scale, of the components of a sensor grid in contact with a conductive shield plate.

FIG. 6 is a perspective view showing the components of the sensor grid in contact with the conductive shield plate 30. As shown in FIG. 5, the sensor grid 22 comprises wire loops 23 and sensor grid substrate 21. As shown in FIG. 6, the wire loops 23 are comprised of pairs of wires 27. The wire loops form the closed path around which the signal voltage is produced by the magnetic induction from the pen coil 17. The loops may be comprised of any conducting material and may be either permanent or temporary. Permanent loops are formed by physically continuous connections of the wire pairs 27. Temporary loops are formed by selecting various wires 27 to form a pair through use of electronic switches. The width of the permanent loops would therefore be fixed, while the width of the temporary loops might vary, depending upon which two wires were selected to form the loop. For clarity, only one set of loops is shown in FIG. 6. Another set of loops, perpendicular to the set shown in FIG. 6, would be required to determine the other coordinate of the designated point.

A shield comprised of a highly magnetic material, as illustrated in FIG. 3, performs not only the shielding function but also avoids the loss of signal encountered when using a simple conductive material as a shield. A material with sufficiently high magnetic permeability can actually double the magnetic signal in the sensor grid. When there is a change in the magnetic lines of force (i.e., a change in the magnetic flux), an electromotive force is produced in the conductor through the principle of electromagnetic induction. The current in the pen coil 17 is pulsed or sinusoidally varying in time, in order to induce signal voltage in the loops of the sensor grid; it also induces current in any conducting shield plate. Magnetic permeability is a factor, characteristic of a material, that is proportional to the magnetic induction, (magnetic flux density) produced in a material divided by the magnetic field strength (vector quantity characterizing the magnetic field). This relative permeability varies with the magnetic field strength and associated flux density.

How good the material is at increasing the signal strength of the magnetic field may be seen by comparing the product of skin depth and magnetic permeability with the width of the loops in the sensor grid. Skin depth is the depth beneath the surface of a conductor, which is carrying current at a given frequency due to electromagnetic waves incident on its surface, at which the current density drops by a factor of e (2.718) below the current density at the surface. To enhance the signal strength of the magnetic field, the product of the permeability and the skin depth of the conducting material should be greater than the width of the loops in the sensor grid. If the magnetic material is not conducting, then the product of the permeability and thickness of the magnetic layer should be greater than the width of the loops in the sensor grid.

One such material of high magnetic permeability which increases the signal strength of the magnetic field is Mumetal. Mumetal is a nickel alloy comprising approximately 5% copper, 2% chromium, 77% nickel, and 16% iron. Mumetal has an initial permeability of 20,000 and a maximum permeability of 100,000. Mumetal is light weight, and sufficiently soft (malleable) to allow shaping or fastening at the edges, as may be required by the packaging environment. In addition to increasing the signal strength, it also prevents penetration of the magnetic field.

Iron-oxide/metal-oxide ceramics (ferrites) also have high magnetic permeability and could be effectively used as a shield material to increase the signal strength.

In another embodiment, a combination of conductive and ferrite materials may be used for the shield. This is illustrated in FIG. 4 which shows a shield plate 24 comprised of magnetic material 28, such as ferrites, with a layer of conductive material 29, such as copper, disposed on the lower surface of the magnetic material, in contact with the sensor grid 22. The first layer beneath the sensor grid is composed of ferrite material which terminates, but does not attenuate, the magnetic signal. Below this is placed a conductive layer which cancels AC magnetic fields from below the sensor grid, to prevent possible saturation of the ferrite material by those fields. For example, a layer of ferrite material of appropriate thickness and composition to cancel the attenuation effect could be disposed on top of a copper sheet (1 mil thickness for 500 KHz field) which effectively shields alternating current (AC) magnetic fields. This is helpful in reducing magnetic noise from sources below the sensor grid which might otherwise saturate the highly magnetic layer.

It should also be noted that shields made from Mumetal or a conductive material with a layer of ferrite material have the added advantage of relaxing the tolerance requirements for any separation between the shield plate 24 and the sensor grid 22, as compared with purely conductive or silicon steel shields.

A material such as Mumetal which will increase the signal strength of the magnetic field is relatively expensive for use in this application. An inexpensive alternative is to place a sheet of conductive material such as aluminum or copper below and in close proximity to the sensor grid to act as a shield. The shield's conductivity and thickness must be sufficient so that the eddy currents induced in the conductor effectively terminate the perpendicular component of the pen's magnetic field, preventing it from penetrating significantly below the shield. This is achieved if the skin-depth (s) and thickness (t) of the shield satisfy the relationship;

$$t >> (s^2)/h$$

where h is the height of the pen coil above the sensor grid. For example, copper has a skin depth of about 0.08 mm at 500 KHz, so, with the pen coil 2 cm above the sensor grid, a copper shield would have to be much greater than (0.08 mm*0.88 mm/20 mm), which is 0.32 microns. Thus a sheet of copper of at least five to ten microns thickness would be desirable. A simple experiment with a 2 micron copper sheet shows about 10:1 attenuation of the signal below the sheet from a pen coil 2 cm above the sheet, verifying the calculated requirement, and suggesting that 10 microns would probably be required for thorough (99% effective) shielding.

In such a configuration with use of a conductive shield, "close proximity" should be construed as approximately one millimeter or less spacing between the shield and the plane of the sensor grid loops. At a separation of 0.5 mm, with the pen coil 1.5 cm above the sensor grid, and using 1 cm wide sensor grid loops, the induced signal voltage in the sensor grid loops is attenuated to approximately one tenth (10%) of the signal voltage without a shield. Thus, in order to maintain operability of the digitizer with such a shield, the detection electronics need to be improved to provide an extra 20 dB of gain, or, alternatively, the inducing current in the pen coil 17 may be increased 10-fold, if sufficient power is available. By placing the conductive shield plate 30 in contact with the sensor grid substrate 21 as shown in FIG. 5, the need for the space between the sensor grid 22 and shield plate 24 as shown in FIG. 2 is eliminated. This saves space and weight which are of particular importance in this packaging environment. The use of copper in close proximity to the sensor grid has the added benefit of stronger attenuation of alternating fields above the grid for distant radiation sources 20 (such as CRT's, lights, or transformers) than for near sources (such as the digitizer pen or stylus 16). This can often result in increased signal to noise ratio in the detected signal.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents. It will be understood by those skilled in the art that various changes in form and detail may be made therein without departing from the spirit and scope of the invention.

Having thus described our invention, what we claim as new and desire to secure by Letters Patent is:

1. An electromagnetic digitizer, comprising:
   a sensor grid, and
   a shield plate disposed under said sensor grid, wherein said shield plate comprises a material with sufficiently high magnetic permeability to increase the magnetic signal in said sensor grid.

2. An electromagnetic digitizer according to claim wherein
   said sensor grid comprises a multiplicity of wires such that said wires form loops, and wherein said shield plate comprises a conductive material and the product of the magnetic permeability and skin depth of said conductive material is greater than the width of said loops in said sensor grid.

3. An electromagnetic digitizer according to claim 1, wherein
   said sensor grid comprises a multiplicity of wires such that said wires form loops, and wherein said shield plate comprises a non-conductive material and the product of the magnetic permeability and the thickness of said non-conductive material is greater than the width of said loops in said sensor grid.

4. An electromagnetic digitizer according to claim 1, wherein
   said shield plate comprises Mumetal.

5. An electromagnetic digitizer according to claim 1, wherein
   said shield plate comprises ferrites.

6. An electromagnetic digitizer according to claim 1, wherein
   said sensor grid includes a sensor grid substrate; and said shield plate is in direct contact with said sensor grid substrate.

7. An electromagnetic digitizer according to claim 6, wherein
   said shield plate comprises Mumetal.

8. An electromagnetic digitizer according to claim 6, wherein
   said shield plate comprises ferrites.

9. An electromagnetic digitizer, comprising:
   a sensor grid comprising a multiplicity of wires,
   a pen comprising a pen coil, and
   a shield plate disposed under said sensor grid, wherein said shield plate comprises conductive material such that said conductive material is of sufficient thickness and conductivity to prevent penetration of the magnetic field of said pen coil, said shield plate being in contact with said sensor grid substrate.

10. An electromagnetic digitizer according to claim 9, wherein:
    said shield plate comprises copper.

11. An electromagnetic digitizer according to claim 9, wherein
    said shield plate comprises aluminum.

12. An electromagnetic digitizer according to claim 9, wherein
    the separation between said shield plate and said wires of said sensor grid is one millimeter or less.

13. An electromagnetic digitizer according to claim 12, wherein
    said shield plate comprises copper.

14. An electromagnetic digitizer according to claim 12, wherein
    said shield plate comprises aluminum.

15. An electromagnetic digitizer, comprising:
    a shield plate disposed under a sensor grid,
    wherein said shield plate comprises a base material of conductive material with a layer of magnetic material disposed on one side of said base material.

16. An electromagnetic digitizer according to claim 15, wherein
    said magnetic material comprises ferrites.

17. An electromagnetic digitizer according to claim 16, wherein
    said conductive material comprises copper.

18. An electromagnetic digitizer according to claim 16, wherein
    said conductive material comprises aluminum.

19. An electromagnetic digitizer, comprising:
    a shield plate disposed under a sensor grid,
    wherein said shield plate comprises a material that increases the magnetic signal in said sensor grid and which prevents penetration of magnetic fields.

20. An electromagnetic digitizer according to claim 19, wherein
    said shield material comprises a Nickel alloy.

21. An electromagnetic digitizer according to claim 19, wherein
    said shield plate comprises Mumetal.

* * * * *

Adverse Decisions In Interference

Patent No. 5,218,173, Richard L. Garwin, Gregory F. Russell, SHIELDING MATERIALS FOR ELECTROMAGNETIC DIGITIZERS, Interference No. 103,723, final judgment adverse to the patentees rendered February 17, 1998, as to claims 1 and 4-21.
*(Official Gazette October 27, 1998)*